3,564,018
PRODUCTION OF LACTONES HAVING FROM SIX TO THIRTEEN RING MEMBERS AND ISO-BUTYRIC ACID
Toni Dockner, Meckenheim, and Rolf Platz, Mannheim, Germany, assignors to Badische Anilin- & Soda-Fabrik Aktiengesellschaft, Ludwigshafen (Rhine), Germany
No Drawing. Filed Jan. 14, 1969, Ser. No. 791,151
Claims priority, application Germany, Jan. 30, 1968, P 16 43 750.6
Int. Cl. C07d 7/06, 9/00; C07c 51/24
U.S. Cl. 260—343    11 Claims

ABSTRACT OF THE DISCLOSURE

An improved process for the production of lactones having six to thirteen ring members and isobutyric acid by reaction of a cyclic ketone having from five to twelve ring members and isobutyric acid by reaction of a cyclic ketone having from five to twelve ring members and iso-butyraldehyde with molecular oxygen or a gas containing the same, the improvement consisting in carrying out the reaction without using a catalyst. Lactones are used in the production of polyester.

---

This invention relates to an improved process for the production of lactones having from six to thirteen ring members and isobutyric acid by reaction of cyclic ketones having from five to twelve ring members and isobutyraldehyde with molecular oxygen.

It is known from Houben-Weyl, "Methoden der Organischen Chemie," volume 6/2 (1963), page 708, that cyclic ketones can be converted into the corresponding lactones with peroxymonosulfuric acid. Considerable amounts of polyesters are however formed. It is also known (loc. cit., page 708) that instead of peroxymonosulfuric acid, use may be made of sodium peroxide, hydrogen peroxide in hydrogen fluoride, or organic peracids for the conversion of ketones into the corresponding lactones. Oligomeric lactones and the corresponding polyesters are however always formed in considerable amounts. It is further known from U.S. patent specification No. 3,025,306 that cyclohexanones with aldehydes can be oxidized to the corresponding caprolactones and carboxylic acids in the presence of molecular oxygen and in the presence of catalysts. The process has the disadvantage that the catalysts used have to be separated from the reaction mixture. Moreover the yields do not satisfy industrial requirements, particularly as regards the carboxylic acids formed.

The object of this invention is to provide an improved process in which good yield of lactones and isobutyric acid are obtained. It is another object of the invention to provide a process in which a catalyst is not required. A further object of the invention is to provide a process in which the formation of polyesters is substantially decreased.

In accordance with this invention these and other objects and advantages are achieved in an improved process for the production of lactones having from six to thirteen ring members and isobutyric acid by reaction of cyclic ketones having from five to twelve ring members and isobutyraldehyde with molecular oxygen or a gas comtaining the same, the improvement consisting in carrying out the reaction without using a catalyst.

Cyclic ketones having from five to thirteen ring members are used for the reaction. They may bear substituents which are inert under the reaction conditions, such as alkyl groups, aryl groups or halogen atoms. Cycloalkanones having six to twelve ring members and containing one to three alkyl groups having one to four carbon atoms, particularly methyl groups, as substituents are preferred as starting materials. Cycloalkanones having six to eight carbon atoms have particular industrial importance as starting materials. Examples of suitable compounds are cyclopentanone, methylcyclopentanone, cyclohexanone, 4-methylcyclohexanone, cyclooctanone and cyclododecanone. Cyclohexanone is preferred for commercial-scale production since it is the cheapest starting material.

The reaction is carried out with molecular oxygen. It is possible to use pure molecular oxygen. In commercial-scale production however it is advantageous to use gases which contain molecular oxygen and inert gases such as nitrogen or carbon dioxide. These gases generally contain from 10 to 30% by volume of oxygen. It is advantageous to use air. From 0.5 to 2.5 moles of molecular oxygen may be used for each mole of isobutyraldehyde used. Particularly good results are obtained by using 1 to 2 moles, especially about 1.5 moles, of molecular oxygen per mole of isobutyraldehyde.

The reaction is advantageously carried out at temperatures of from 10° to 80° C., preferably at temperatures of from 20° to 50° C. It is possible to carry out the reaction at atmospheric pressure. It is advantageous however to use superatmospheric pressure, for example up to 25 atmospheres. The reaction may be carried out without using a solvent. It is also possible however to use solvents which are inert under the reaction conditions. Examples of suitable solvents are hydrocarbons which are inert to oxidation reactions, for example benzene. Examples of other suitable solvents are esters such as ethyl acetate and propylene glycol diacetate; ketones such as acetones; and chlorohydrocarbons such as chlorobenzene.

It is an essential feature of the invention that the reaction is carried out without using a catalyst, i.e. no substance having catalytic activity is added to the reaction mixture. Special purification of the starting material from any traces of compounds having catalytic activity is not necessary. The new process is remarkable in view of the fact that it is known from U.S. patent specification No. 3,025,306 that the reaction of cyclohexanones with aldehydes in the presence of molecular oxygen does not take place in the absence of catalysts. It has been found that surprisingly this is not true when isobutyraldehyde is used.

Isobutyraldehyde and the cyclic ketones are advantageously used in a molar ratio of from 1:05 to 1:10. Particularly good results are obtained by choosing a molar ratio of isobutyraldehyde to cyclic ketone of from 1:1 to 1:5.

The process according to the invention may be carried out for example by placing isobutyraldehyde and one of the said cyclic ketones in the specified ratio in a vessel and passing air therethrough at the said temperatures. It is preferable to carry out the reaction under superatmospheric pressure by passing a gas containing molecular oxygen into the said mixture while mixing well and using superatmospheric pressure. In commercial-scale production the reaction is preferably carried out continuously in suitable apparatus, for example in a number of successive stages. The reaction mixture obtained is worked up by known methods, for example by fractional distillation, and the lactones and isobutyric acid are isolated.

The lactones prepared by the process of the invention are suitable for the production of polyesters.

The invention is illustrated by the following example. The parts specified in the example are by weight unless stated otherwise. Parts by volume bear the same relation to parts by weight as the liter to the kilogram.

EXAMPLE 200 parts of benzene and 100 parts of cyclohexanone are placed in a reaction vessel having a capacity of 500 parts by volume. While stirring vigorously, 15,000 parts by volume (S.T.P.) of oxygen is passed in per hour and 72 parts of isobutyraldehyde is metered in during five hours. A temperature of 30° C. is maintained during the reaction. Oxygen is passed in for another hour to complete conversion of the isobutyraldehyde. The reaction mixture is separated into its components by distillation. 200 parts of benzene, 69 parts of cyclohexanone, 80 parts of isobutyric acid (90% of the theory with reference to isobutyraldehyde reacted), 30 parts of epsilon-caprolactone (83% of the theory with reference to cyclohexanone reacted) and 5 parts of residue containing adipic acid, hydroxy-caproic acid, polycaprolactone and glutaric acid are obtained.

COMPARATIVE EXAMPLE

The procedure described in Example 1 is followed except that the reaction is carried out in the presence of 10 p.p.m. of cobalt (II) ethylhexanate with reference to the amount of cyclohexanone used. The product is worked up analogously. A yield of 79% of the theory of isobutyric acid with reference to isobutyraldehyde reacted and a yield of 75% of the theory of epsilon-caprolactone with reference to cyclohexanone reacted are obtained.

We claim:

1. An improved process for the production of lactones having from six to thirteen ring members and isobutyric acid by contacting a cyclic ketone having from five to twelve ring members with molecular oxygen or a gas containing molecular oxygen and with isobutyraldehyde in the ratio of from 0.5 to 2.5 moles of molecular oxygen and 0.5 to 10 moles of cyclic ketone per mole of isobutyraldehyde, wherein the improvement consists in carrying out the reaction without using a catalyst.

2. A process as claimed in claim 1 wherein a cyclic ketone having from six to twelve ring members is used as a starting material.

3. A process as claimed in claim 1 wherein a cyclic ketone having from six to eight ring members is used as a starting material.

4. A process as claimed in claim 1 wherein cyclohexanone is used as a starting material.

5. A process as claimed in claim 1 wherein a gas containing from 10 to 30% by volume of molecular oxygen is used.

6. A process as claimed in claim 1 wherein from 1 to 2 moles of molecular oxygen is used per mole of isobutyraldehyde.

7. A process as claimed in claim 1 wherein from 1 to 5 moles of the cyclic ketone having five to twelve ring members is used per mole of isobutyraldehyde.

8. A process as claimed in claim 1 wherein a temperature of from 10° to 80° C. is used.

9. A process as claimed in claim 1 wherein a temperature of from 20° to 50° C. is used.

10. A process as claimed in claim 1 wherein a pressure of up to 25 atmospheres is used.

11. A process as claimed in claim 1 wherein a solvent which is inert under the reaction conditions is used.

References Cited

UNITED STATES PATENTS 3,025,306   3/1962   Guest et al. _____ 260—343

JOHN M. FORD, Primary Examiner

U.S. Cl. X.R.

260—343.5, 530